United States Patent

[11] 3,588,619

| [72] | Inventor | Beryl W. Layton |
| | | Cedar Rapids, Iowa |
| [21] | Appl. No. | 802,102 |
| [22] | Filed | Feb. 25, 1969 |
| [45] | Patented | June 28, 1971 |
| [73] | Assignee | Square D Company |
| | | Park Ridge, Ill. |

[54] MOUNTING BRACKET FOR A MOLDED-CASE ELECTRIC CIRCUIT BREAKER
6 Claims, 6 Drawing Figs.

[52] U.S. Cl. .................................................. 317/119, 200/50.15
[51] Int. Cl. ...................................................... H02b 1/04
[50] Field of Search ........................................... 200/50.15; 317/119

[56] References Cited
UNITED STATES PATENTS

| 3,005,064 | 10/1961 | Baird | 200/50.15 |
| 3,271,626 | 9/1966 | Howrilka | 317/101 |
| 3,346,777 | 10/1967 | Leonard | 317/119 |
| 3,354,357 | 11/1967 | Jorgensen | 317/119 |

*Primary Examiner*—Lewis H. Myers
*Assistant Examiner*—Gerald P. Tolin
*Attorneys*—Harold J. Rathbun and Paul J. Rose ABSTRACT: The bracket includes a rotatable cam means and is secured to one end portion of a circuit breaker having a set of plug-on terminal jaws at its other end portion. When the bracket and circuit breaker are placed on a mounting pan of an electrical panelboard, the cam means extends through a rectangular opening in the mounting pan in position to selectively engage opposite side edges of the opening upon rotation thereby to move the circuit breaker toward and away from a stack of bus bars on the pan.

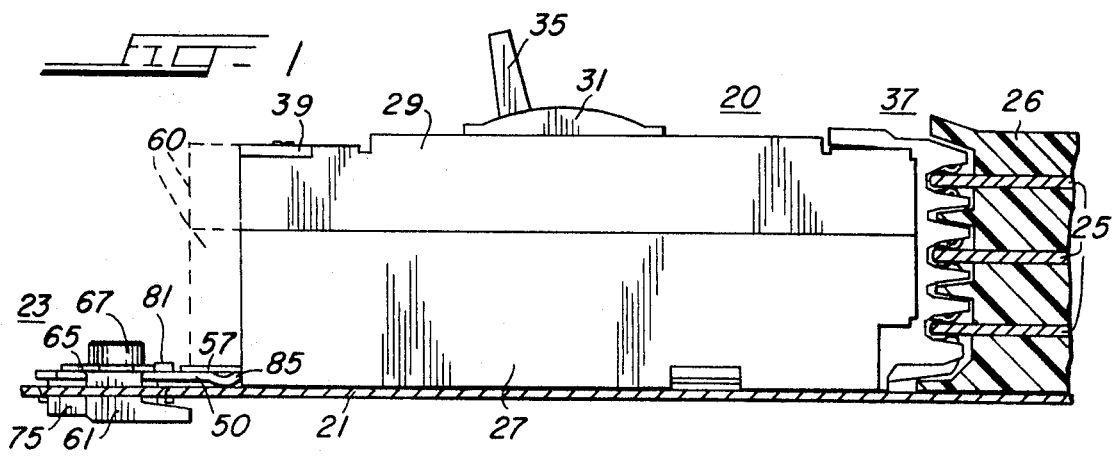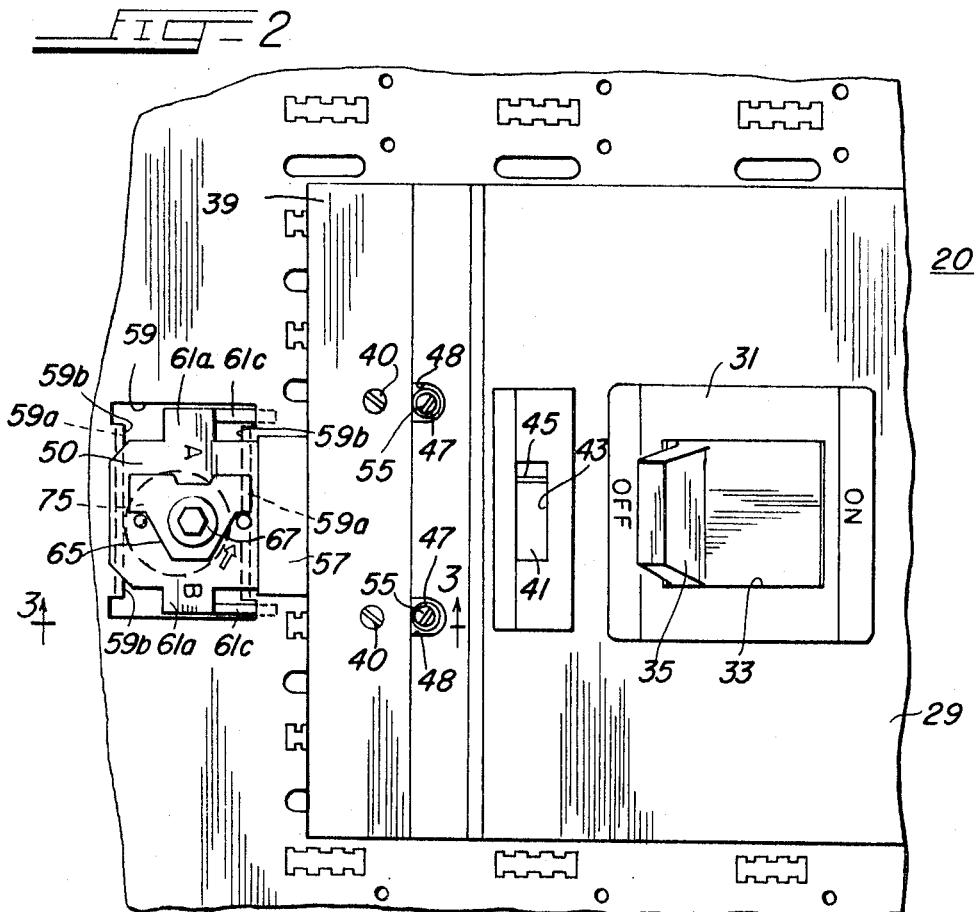

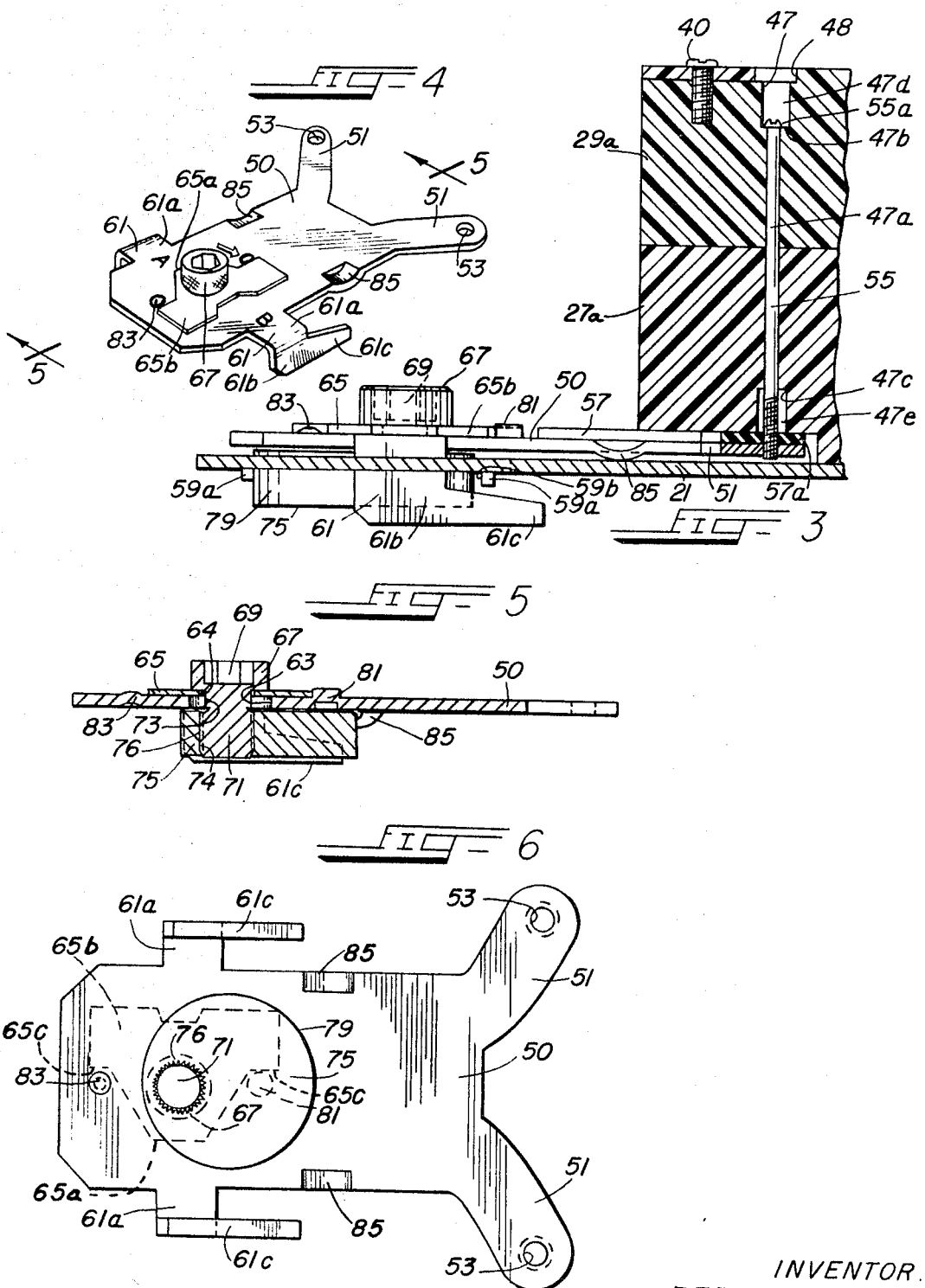

MOUNTING BRACKET FOR A MOLDED-CASE ELECTRIC CIRCUIT BREAKER

This invention relates in general to mounting brackets, and more particularly to a mounting bracket for securing a circuit breaker in an electrical panelboard and for moving the circuit breaker into and out of connection with a plurality of bus bars.

Heretofore, molded-case circuit breakers have been of relatively small size so that their movements into and out of plug-on connection with bus bars have been easily accomplished by merely prying the circuit breaker on and off the bus bars by means of a leverage drive separate from any mounting bracket.

Recently, the current-carrying ability of molded-case circuit breakers has been so increased that the lateral force required to plug and unplug the terminal jaws of the circuit breakers on and from the bus bars has become excessive. The mounting bracket of the present invention includes a rotatable cam means juxtaposed on a bottom surface of the bracket to provide a means for driving the circuit breaker into and out of connection with the bus bars by an interference cooperation of a peripheral edge face of the cam means with one or the other of a pair of opposite side edges of a generally rectangular opening in the mounting pan of the panelboard.

An object of the present invention is to provide an improved mounting bracket for attaching a heavy molded-case circuit breaker to an electrical panelboard and for moving the circuit breaker into and out of connection with a plurality of bus bars.

Another object of the present invention is to provide an improved mounting bracket having a rotatable cam means cooperating respectively with a pair of opposite side edges of a generally rectangular opening in a mounting pan of a panelboard for driving plug-on terminal jaws of a circuit breaker into and out of connection with bus bars of the panelboard and a pair of laterally spaced protruding arm portions cooperating with the marginal area of the pan about the rectangular opening for maintaining the circuit breaker in its mounted position.

Other objects in accordance with the preceding objects are to provide means for rotating the cam means by the use of a separate tool, to provide an eccentric orientation of the cam means with respect to the rotating means so that the rotation of the cam means against the side edges of the opening in the pan imparts endwise movement to the mounting bracket and to the circuit breaker, and to provide a stop means for limiting the rotation of the cam means in either of two opposite directions to prevent the mounting bracket from being moved to both the connected and disconnected positions by the continued angular movement of the cam means in the same direction of rotation.

Other objects and advantages will become apparent from the following description wherein reference is made to the drawings, in which:

FIG. 1 is a side view of a molded-case electric circuit breaker mounted on a panelboard by a mounting bracket in accordance with the present invention;

FIG. 2 is a top view of the left-hand portion of FIG. 1;

FIG. 3 is a fragmentary sectional view taken generally along the line 3—3 of FIG. 2;

FIG. 4 is a perspective view of the mounting bracket of FIG. 1;

FIG. 5 is a sectional view of the mounting bracket taken generally along the line 5—5 of FIG. 4; and FIG. 6 is a bottom view of the mounting bracket of FIG. 1.

FIG. 1 shows a molded-case circuit breaker 20 secured at its load end portion to a relatively thin mounting pan 21 of an electrical panelboard by a mounting bracket 23 in accordance with this invention. The panelboard may be of the type disclosed in U.S. Pat. No. 3,346,777, issued Oct. 10, 1967, and U.S. Pat. No. 3,354,357, issued Nov. 21, 1967, to which reference may be made for a more detailed description. The circuit breaker is mechanically and electrically connected at its line end to three flat bus bars 25 mounted in flatwise stacked, parallel, spaced relationship on the mounting pan 21 and separated by suitable insulation 26.

The circuit breaker 20 has a molded-case housing including a base 27 and a main cover 29, the main cover 29 having a centrally positioned raised frame 31 surrounding an opening 33 (FIG. 2) through which an external operating handle 35 extends for opening and closing the internally mounted contacts of the circuit breaker in a manner well known in the art. A plurality of pairs of plug-on terminal jaws 37 are positioned at the line end of the circuit breaker 20, each pair of jaws 37 being adapted to receive an edge portion of one of the bus bars 25 upon endwise movement of the circuit breaker 20 toward the bus bars thereby to plug the breaker onto the bus bars.

At the load end portion of the circuit breaker 20 is a terminal cover 39 secured to an upper end portion of the main cover 29 by screws 40 and covering a plurality of individual load terminal connectors (not shown). Adjacent the terminal cover 39 is a reciprocally mounted member 41 providing means for adjusting a tripping mechanism (not shown) of the circuit breaker 20, the member 41 being exposed through an opening 43 in the cover and having a slot 45 shaped to accommodate the end of a tool such as a screwdriver for adjusting the position of the member 41.

As shown in FIGS. 2 and 3, the load end portion of the circuit breaker 20 has a pair of holes 47 positioned adjacent the terminal cover 39 and opening respectively into a pair of recesses 48. Each hole 47 extends entirely through aligned wall portions, such as wall portions 27a and 29a of the base 27 and the main cover 29, which wall portions separate the plurality of terminal connectors underlying the terminal cover 39 and divide the interior of the circuit breaker 20 into compartments each containing a pair of separable contacts (not shown), in a manner well known in the art. Each of the holes 47 has an intermediate reduced diameter portion 47a provided partially in the base 27 and partially in the main cover 29, and defining an upwardly facing shoulder 47b and a downwardly facing shoulder 47c positioned respectively inwardly of the respective outer surfaces of the main cover 29 and the base 27, which shoulders 47b and 47c are respectively bottoms of enlarged-diameter portions 47d and 47e of each hole 47.

The mounting bracket 23 includes a generally flat mounting plate 50 having a pair of diverging legs 51 extending outwardly from a forward end thereof, and having threaded holes 53 in their outer end portions, respectively. Elongated screws 55 are received within the holes 47, respectively, the screws extending through the reduced diameter portions 47a and being threaded into the respective holes 53, thus providing a means for securing the mounting bracket 23 to the base 27 of the circuit breaker 20. As each of the screws 55 is threaded further within its associated threaded hole 53, an enlarged head portion 55a of each screw 55 tightens against the associated upwardly facing shoulder 47b of the hole 47 within which the respective screw 55 is received.

If desired, an insulator 57 (FIG. 3) shaped complementary to the forward end portion of the mounting plate 50 and having a pair of diverging legs 57a, only one of which is shown in FIG. 3, may be interposed between the mounting plate 50 and the bottom wall of the base 27 of the circuit breaker 20 in order to provide additional insulation between the internal components of the circuit breaker 20 and the mounting pan 21.

The mounting pan 21 has a generally rectangular opening 59 (FIG. 2) positioned outwardly of and immediately adjacent to the load end of the circuit breaker 20, as shown most clearly in FIGS. 2 and 3, when the circuit breaker is positioned on the pan 21 for connection to the bus bars 25 as indicated by the broken lines 60. The opening 59 has a pair of opposite and longer side edges parallel with the transverse axis of the circuit breaker 20, and preferably each of the longer side edges is provided with a pair of notches at its opposite ends to permit an associated elongated tab 59a to be turned downwardly at right angles to the plane of the mounting pan 21, the pair of tabs presenting respective flat surfaces 59b facing inwardly of the opening 59.

The mounting plate 50 has a pair of arms 61 having flat portions 61a, respectively, extending perpendicularly outwardly in the plane of, and from the opposite side edges of, the central portion of plate 50 adjacent a rearward end thereof opposite from the legs 51. The outer end portions of the respective arms 61 are turned downwardly at right angles to the plane of the plate 50 to provide downwardly extending portions 61b having respective fingers 61c extending parallel to the central portion of the plate 50 toward the legs 51.

The mounting plate 50 has a circular hole 53 (FIG. 5) positioned along the longitudinal axis of the plate generally centrally of the opposite arms 61. A generally T-shaped indicating bracket 65, having a leg portion 65a and a cross arm 65b (FIG. 6) is disposed adjacent a top surface of the plate 50. The bracket 65 has a noncircular hole 64 (FIG. 5) disposed in the leg portion 65a and aligned with the hole 63. As shown in FIGS. 2 and 4, the bracket 65 has two opposite terminal positions, which may be identified as position A and position B, corresponding to unconnected and connected positions for the circuit breaker 20, respectively, in a manner to be later described. When the bracket 65 is positioned in either of its two extreme turned positions A and B, the cross arm 65b is parallel to, but spaced oppositely and outwardly from, the longitudinal axis of the plate 50.

A drive shaft 71 having a knurled surface 74 and an enlarged head 67 is mounted in the holes 63 and 64 of the plate 50 and bracket 65. The head 67 has a hexagonal recess 69 for receiving a driving tool (not shown). Further, the portion of the head 67 within the plate 50 and bracket 65 has a pair of opposed flat surfaces, one of which is indicated by numeral 73 in FIG. 5, and the size and shape of the hole 64 generally correspond to the size and shape of the cross section of the portion of the head 67 within the plate 50 and bracket 65, so that the bracket 65 is keyed to the head 67.

A cylindrical rotatable cam means 75 has an offcenter hole 76 extending therethrough in which the shaft 71 is received, the knurled surface 74 providing an interference fit (FIGS. 5 and 6) with the interior surface of the hole 76. The cam means 75 is thus disposed adjacent a bottom surface of the plate 50 in an eccentric orientation with respect to the shaft 71. The cam means 75 has a thickness substantially equal to the length of the shaft 71 projecting beyond the plate 50. A peripheral edge face 79 of the cam means 75 serves as a cam surface in a manner to be later described.

The mounting plate 50 further includes a boss 81 and a slightly raised node 83 positioned along the longitudinal axis of the plate 50 respectively forwardly and rearwardly of the hole 63. The cross arm 65b of the bracket 65 has two extreme inwardly facing edges 65c which abut respectively against opposite sides of the boss 81 to limit the extent of rotation of the bracket 65 when the bracket is rotated in one or the other of its opposite directions of rotation to position A or position B. When the bracket 65 is oppositely rotated, the bracket 65 passes over the node 83, the node serving to restrain the bracket 65 in either of its two extreme opposite positions A or B by abutting against the stop surface 65c opposite from the stop surface 65c in contact with the boss 81.

When the mounting bracket 23 is secured to the base 27 of the circuit breaker 20 by the bolts 55, the plate 50 has its longitudinal axis aligned with the longitudinal axis of the circuit breaker 20, and when the circuit breaker 20 and mounting bracket 23 are then placed on the mounting pan 21 in position to be connected to the bus bars 25, their respective longitudinal axes are perpendicular to the bus bars 25. The plate 50 includes a pair of downwardly extending spacer portions 85 positioned intermediately of the length of the plate 50 on opposite sides thereof and engageable with the mounting pan 21 to maintain the plate 50 in spaced relationship thereto. The arms 61 and the cam means 75 are received within the opening 59 so that the downwardly extending portions 61b of the arms 61 extend entirely through the opening 59 with the fingers 61c extending on opposite sides of the tabs 59a to underlie the marginal area of the pan 21 about the opening 59. The cam means 75 has its edge face 79 positioned between the two flat surfaces 59b.

When the circuit breaker 20 is in its unconnected position with respect to the bus bars 25, the bracket 65 is in position A, as most clearly shown in FIG. 4, and the cam means 75 is in the position shown in FIGS. 5 and 6. In order to move the circuit breaker 20 endwise in a direction along its longitudinal axis to its connected position with respect to the bus bars 25, the shaft 71 and bracket 65 are rotated in the direction of the arrow, as viewed in FIG. 4.

As the shaft 71 and bracket 65 are rotated to position B as shown in FIG. 2, the cam means 75 rotates to the position shown in FIGS. 1 through 3. As the cam means 75 is so turned, the edge face 79 engages the leftmost flat surface 59b, as viewed in FIG. 3, thus causing the plate 50 to move in the direction necessary to connect the plug-on terminal jaws 37 respectively to the edge portions of the bus bars 25. The continued rotation of the cam means 75, after it has passed just beyond an overcenter position with respect to the adjacent flat surface 59b, is prevented by the abutment of one of the stop surfaces 65c against the boss 81. When the jaws 37 are connected to the bus bars 25, the fingers 61c of the arms 61 are positioned beneath the rightmost marginal area of the opening 59 as viewed in FIGS. 2 and 3, so as to attach the circuit breaker 20 and mounting bracket 23 to the pan 21.

In order to disconnect the circuit breaker 20 from the bus bars 25 and dismount the circuit breaker 20 and mounting bracket 23 from the pan 21, shaft 71 and bracket 65 are rotated in the direction of the arrow, as viewed in FIG. 2. As the shaft 71 causes the cam means 75 to rotate in a similar direction, the edge face 79 of the cam means 75 engages the rightmost flat surface 59b, as viewed in FIG. 3, to cause the plate 50 to move in the direction necessary to disconnect the plug-on terminal jaws 37 from the bus bars 25. The movement of the cam means 75 is arrested just before it passes its overcenter position by the abutment of the other stop surface 65c of the bracket 65 against the other side of the boss 81. When the plate 50 is moved to a position corresponding to the unconnected position of the circuit breaker 20, the fingers 61c of the arms 61 are removed from their underlying position with respect to the marginal area of the pan 21 which defines the rightmost edge of the opening 59, as viewed in FIG. 3, and thus will allow the arms 61 and cam means 75 to be removed from the opening 59, and the mounting bracket 23 and circuit breaker 20 to be removed from the mounting pan 21.

The downwardly turned tabs 59a are not essential, nor is it essential that the opening 59 be in the mounting pan itself. In certain embodiments, the circuit breaker may be mounted above the mounting pan and the opening 59 provided in a support member secured to the mounting pan.

I claim:

1. An electrical panelboard and circuit breaker assembly comprising an electrical panelboard having an elongated bus bar and stationary aperture defining means spaced transversely of the bus bar, and an electric circuit breaker on the panelboard having plug-on terminal jaws adjacent one end and a bracket secured thereto adjacent the other end, the bracket having a cam rotatably mounted thereon, disposed in the aperture defining means, and rotatable in one direction to bear against one side of the aperture defining means and move the circuit breaker toward the bus bar to plug the terminal jaws thereon transversely thereof.

2. An assembly as claimed in claim 1 including a drive shaft extending through the bracket, the cam being secured to the drive shaft on one side of the bracket, and the drive shaft having a portion on the other side of the bracket cooperable with a tool for turning the drive shaft and cam.

3. An assembly as claimed in claim 2 including an indicating member secured to the drive shaft on the opposite side of the bracket from the cam.

4. An assembly as claimed in claim 3 including stop means on the bracket cooperable with the indicating member to limit rotation of the drive shaft, cam, and indicating member.

5. An assembly as claimed in claim 1 including a finger portion on the bracket disposed in the aperture defining means and movable into underlying relationship with the aperture defining means upon the moving of the circuit breaker toward the bus bar.

6. An electrical panelboard and circuit breaker assembly comprising an electrical panelboard including a generally flat mounting pan having a plurality of elongated flat bus bars mounted thereon with their flat sides parallel thereto, the bus bars being spaced from and aligned with each other in a direction perpendicular to the mounting pan, and aperture defining means on the mounting pan spaced transversely of the bus bars, and an electric circuit breaker on the mounting pan having an elongated molded case, a plurality of sets of plug-on terminal jaws adjacent one end of the case and pluggable respectively onto the bus bars transversely thereof, and a bracket secured to the circuit breaker adjacent the other end of the case, the bracket having a cam rotatably mounted thereon, disposed in the aperture defining means, rotatable in one direction to bear against one side of the aperture defining means and move the circuit breaker longitudinally of the elongated molded case toward the bus bars to plug the sets of plug-on terminal jaws respectively thereon transversely thereof and rotatable in an opposite direction to bear against the other side of the aperture defining means and move the circuit breaker away from the bus bars to disconnect the terminal jaws therefrom.